United States Patent

Hess et al.

[15] 3,685,581

[45] Aug. 22, 1972

[54] SECONDARY RECOVERY OF OIL

[72] Inventors: Howard V. Hess, Glenham; Frank E. Guptill, Jr., Fishkill, both of N.Y.

[73] Assignee: Texaco Inc., New York, N.Y.

[22] Filed: March 24, 1971

[21] Appl. No.: 127,702

[52] U.S. Cl. .................................166/272, 166/303
[51] Int. Cl. ........................E21b 43/20, E21b 43/24
[58] Field of Search...............166/272, 303, 268, 275

[56] References Cited

UNITED STATES PATENTS

| | | |
|---|---|---|
| 2,862,558 | 12/1958 | Dixon...........................166/272 |
| 3,352,355 | 11/1967 | Putman....................166/272 X |
| 3,465,826 | 9/1969 | Terwilliger..................166/303 |
| 3,528,501 | 9/1970 | Parker......................166/272 X |

*Primary Examiner*—Robert L. Wolfe
*Attorney*—Thomas H. Whaley, Carl G. Ries and L. H. Phelps, Jr.

[57] ABSTRACT

Promoting secondary recovery of crude petroleum from a subsurface reservoir by flooding the reservoir with a continuous phase liquid admixture of hydrocarbon oil and water under high temperatures and pressures at which the oil dissolves water.

5 Claims, 1 Drawing Figure

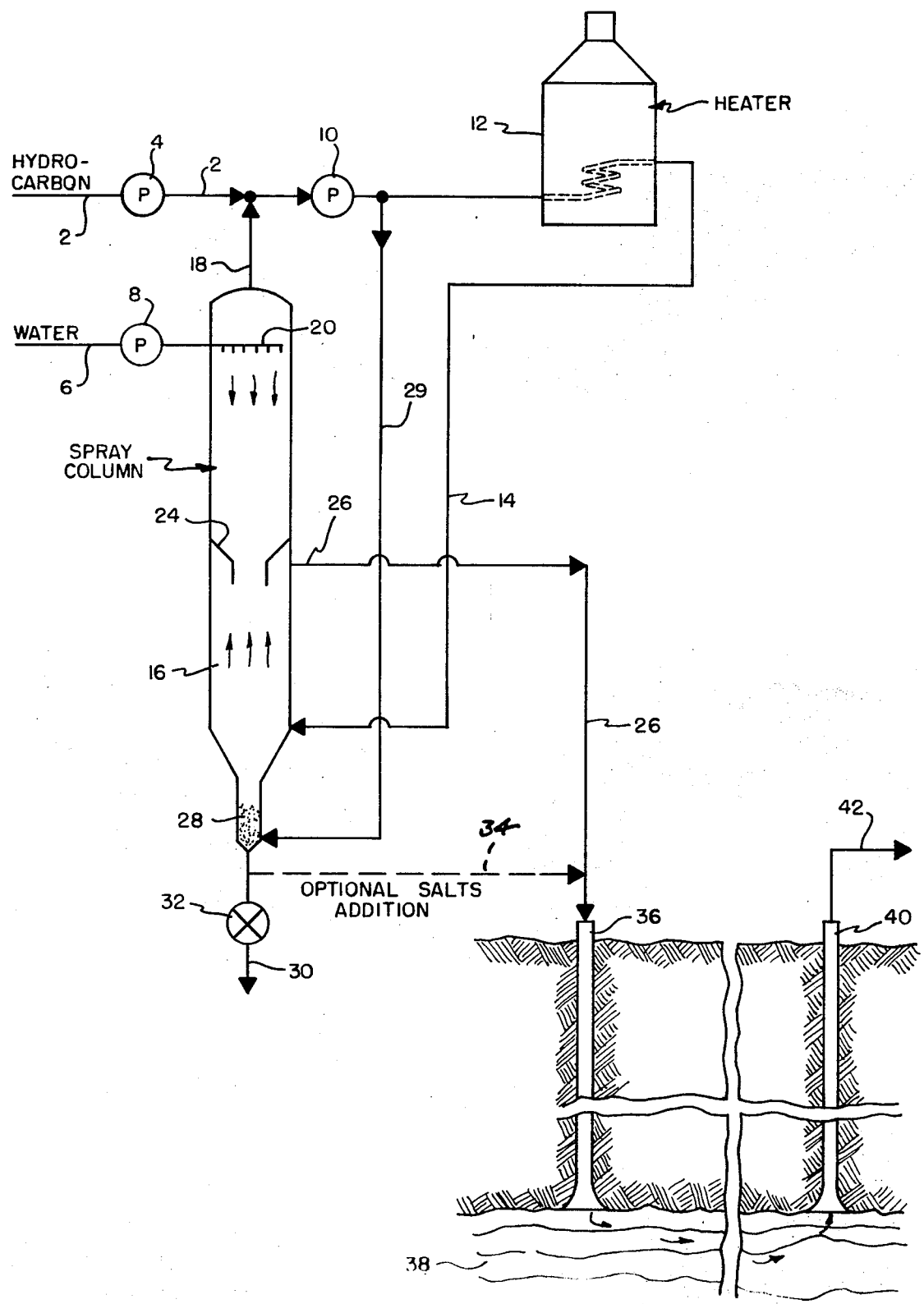

SECONDARY RECOVERY OF OIL

The present invention relates to recovery of oil from subsurface formations and in particular to oil production from subterranean reservoirs which, due to the depletion of primary production, or for other reasons, are difficultly producible and therefore require some secondary stimulation.

Various secondary methods have been proposed for stimulating the flow of oil as well as inducing driving forces effective to reinstitute the recovery of oil from producing wells.

In its simplest form this involves the introduction into an injection well of a suitable flooding material under sufficient pressure to impose a substantial driving force against the reservoir oil.

This, for example, has been carried out with gaseous and liquid materials, notably with natural gas or with water.

More recently, however, improved results have been obtained by conducting the injection of high pressure steam. Also, it has been proposed to introduce hydrocarbons which are lighter, that is, have a lower viscosity, than the reservoir carbons. In fact, it has been found that usually a small, thin layer of hydrocarbon liquid ahead of the more prosaic driving flood such as water, natural gas or steam, has tended to improve ultimate production from a spaced producing well.

Also among variations that have been proposed is the introduction of a mixture of steam and hydrocarbon vapors. This process, as well as prior related processes heretofore disclosed, are described in U.S. Pat. No. 2,862,558. It manifestly involves an endeavor to obtain the simultaneous effect of hydrocarbon and water phase upon the reservoir. Insofar as the prior art was then concerned, this required a vaporous mixture since the available liquid oil and water phases were immiscible.

The present invention, on the other hand, specifically concerns the use of a secondary drive flood comprising an intimate liquid phase solution of hydrocarbon and water, that is to say, an intimate intermixture or intersolution of two normally repugnant liquids accomplished in accordance with a known procedure and method which the inventors have described and claimed in a number of prior U.S. patents, as follows: U.S. Pat. Nos. 3,316,172; 3,318,805; 3,325,400; 3,350,299; 3,350,300.

More specifically, the inventions therein disclosed involve the extraction of water from brines, for example, by a hot hydrocarbon liquid at a high temperature, at which a hydrocarbon liquid is capable of selectively absorbing or dissolving a substantial proportion of water. One requirement, of course, is that the elevated temperatures required must be accompanied by pressures sufficient to maintain both the hydrocarbon liquid and the water in liquid phase condition.

The temperatures involved are considerable, normally in the region substantially above 500° F. and with pressures accordingly above 1,000 psig.

Also, and manifestly to meet the requirement for a normally liquid phase hydrocarbon, it is preferable naturally to employ hydrocarbons in the range of six to 30 carbon atoms per molecule.

As respects the combined liquid water-hydrocarbon phase, applicants do not desire to be bound by any statement at this time regarding its precise molecular nature, whether solution or whatever other form it may be. It can, however, be asserted that this combination is in fact a liquid phase under the conditions noted and therefore as has been hitherto explained, it may be referred to simply as a phase in which the hydrocarbon forms a complex with water.

Inasmuch as the complexing operation has been thoroughly described and explained in the applicants' aforementioned patents, no further details are supplied herein other than to make reference to such above listed patents for full description of such details and, by reference, to make such disclosures a part of the present disclosure.

While the foregoing processes, in a general way, have the objective of recovering pure water from a natural brine, based on the selective extraction affinity of the hydrocarbon for water, (as distinguished from the soluble mineral constituents of the brine) the present invention uses the concept in a different manner.

More specifically, the present invention contemplates the injection into a producing formation thru an injection well, of the high pressure, high temperature liquid oil-water complex as a drive medium for the secondary production of oil from the formation. Specifically, the reservoir oil may be driven toward a spaced producing well or, alternatively, the treatment may be used for the stimulation of a single producing well. That is to say, in known ways the high pressure, high temperature complex is introduced into a producing formation in substantial quantity followed by a termination of the injection operation and release of pressure, whereby the contents of the reservoir are caused to produce more plentifully from the same well.

Referring now to one specific example of the present invention, reference is made to the attached drawing wherein the single FIGURE represents a flow diagram of the present processes.

Therein a liquid hydrocarbon is introduced thru line 2 via pump 4 which brings the pressure of the system up sufficiently to maintain the system in a liquid phase condition at the temperatures involved. Similarly, the liquid water phase, which is ordinarily only available in the field as impure surface water or brine, is introduced thru line 6 and corresponding pump 8. The hydrocarbon oil continues thru circulating pump 10 and heater 12 at which it is raised above the critical high temperature in the range aforementioned at which the hydrocarbon oil assumes a high extractive affinity for water. The hot oil continues from the heater thru pipe 14 into the lower portion of the column 16, a residual portion, as hereinafter indicated, passing continuously upward thru the column and out thru pipe 18, from whence it is re-introduced into pipe 2.

The incoming water or brine stream at pipe 6 goes into the upper end of column 16 via spray head 20 and therefore proceeds to move downwardly thru the upflowing column of oil.

As a result of this interaction of the two streams, therefore, the upflowing hot hydrocarbon oil continuously heats the down-flowing brine so that at an intermediate level in the column the two streams have reached a complexing temperature of, for example, 575° F. at 2,000 psi. This in the present design may take place at the position in the spray column just below the baffle 24 from which, accordingly extends outlet pipe 26.

Therefore, flowing thru the pipe 26 is a high pressure, high temperature complex of oil and water, namely a continuous, clear phase comprising a solution, extract, or whatever the case may be, of molecularly intermingled oil and water.

Inasmuch as the complex, as hitherto explained, inherently rejects the soluble mineral content of the feed water, these automatically settle downwardly into sludge chamber 28 at the bottom of column 16. Thus, in known ways, the solid materials form a relatively concentrated solution in excess brine fed to the system, or, depending upon the amount of the excess feed water, a gelatinous floc. A predetermined small proportion of the recycled oil is caused to by-pass the heater 12 by means of line 29 and control valves not shown, thereby cooling sludge column 28.

In either event these may be continuously removed from the system and discarded via a sludge blowdown thru outlet 30 controlled by valve 32. Alternatively, where such is not objectionable, the waste material can be periodically returned to the well via dotted line 34.

Referring now to the injection well, which has been designated by the numeral 36, it will be noted that pipe 26 leads directly thereto and may be suitably insulated or lagged to maintain temperature conditions. The aforesaid line 34, on the other hand, may also lead to the well pipe 36, controlled by suitable valves not shown. The complex is therefore introduced directly into the producing formation 38 at the bottom of the well where it proceeds to intermingle with the contents of the reservoir and drive them toward a second or producing well 40, causing the produced constituents to flow upwardly in the well and be recovered thru pipe 42.

The following is a table listing the specific operating conditions of a contemplated secondary recovery operation employing as feed materials a hydrocarbon comprising a kerosene boiling fraction and a stream of brine. In the table:

Stream A represents the incoming hydrocarbon stream.
Stream B the incoming brine.
Stream C the recycling hydrocarbon stream from the upper portion of tower 16.
Stream D represents the stream of hydrocarbon/water complex delivered thru pipe 26 into the producing formation at the injection well.
Stream E is the highly preheated hydrocarbon stream passing into the lower portion of the tower from the heater via line 14.
Stream F is the relatively cool oil stream passing via pipe 29 into the lower portion of settling leg 28.
Stream G is the sludge blowdown discharged thru line 30.

Given in each case are the temperature and pressure of the streams, the water content in pounds per hour, the hydrogen content in pph and the salt content of the stream.

TABLE I

| STREAM | A | B | C |
|---|---|---|---|
| Temp. °F. | 60 | 60 | 80 |
| psig | 15 | 0 | 2300 |
| $H_2O$, LBH | 0 | 13600 | Trace |
| HC LBH | 22,280 | 0 | 25,730 |
| Salts LBH | 0 | 136 | 0 |
| STREAM | D | E | F | G |
| Temp. °F. | 585 | 605 | 80 | 100 |
| psig | 2300 | 2300 | 2300 | 2300 |
| $H_2O$, LBH | 12,240 | Trace | 0 | 1360 |
| HC LBH | 22,280 | 45,350 | 2660 | Trace |
| Salts LBH | Tr | Tr | 0 | 136 |

It will be apparent therefore that the product going into the injection well is a continuously liquid phase comprising somewhat less than twice as much hydrocarbon as water and only a trace of salt content.

Table II gives similar operating conditions in the case of a hydrocarbon stream composed of LPG.

TABLE II

| STREAM | A | B | C | D |
|---|---|---|---|---|
| Temp. °F. | 60 | 60 | 80 | 585 |
| psig | 15 | 15 | 2300 | 2300 |
| $H_2O$, LBH | 0 | 13,600 | Trace | 12,240 |
| HC LBH | 5680 | 0 | 18,830 | 5680 |
| Salts LBH | 0 | 136 | 0 | Trace |
| STREAM | E | F | G | |
| Temp. °F. | 605 | 80 | 100 | |
| psig | 2300 | 2300 | 2300 | |
| $H_2O$, LBH | Trace | 0 | 1360 | |
| HC LBH | 22,620 | 1890 | trace | |
| Salts LBH | 0 | 0 | 136 | |

Of the benefits contemplated by the present treatment one is the high content of available heat supplied directly to the producing formation. This has been demonstrated in many fields to be productive of valuable results. Moreover the single phase complex, possessing as it does, both the properties of oil and water, should be mutually acceptable to both the oil phase and the connate water typically accompanying it in the reservoir, thereby, at least on the flood front, overcoming the resistance which is normally encountered as the result of the repugnant nature of these two phases in the formation. In other words, it is obvious that a single phase, continuous solution of the hydrocarbon and water must penetrate the formation better than alternating slugs of water and hydrocarbon which have been previously proposed. Moreover, it presumably will possess the advantage of creating continuous flow channels thru the interstices of the formation as distinguished from the broken and constricted channels caused by the presence of mutually repugnant oil and water phases. In addition, it is to be observed that the introduction of this large amount of heat energy into the formation is accomplished without the serious restriction which attends all boiler operations, namely the vital necessity for water pre-treatment. In other words, the present invention does away with the scaling effect which seriously restricts steam generation operations and which is particularly prevalent in producing fields where the only water present is usually either impure surface water or an oil field brine.

These and other advantages therefore make the invention particularly attractive from the practical operating as well as the producing standpoint.

We claim:

1. In a method of producing crude petroleum from a subsurface crude oil reservoir which comprises flooding said reservoir by injecting a continuous phase admixture of liquid hydrocarbon oil and water in the form of a complex comprising substantial proportions of hydrocarbon and water, said continuous phase complex consisting of molecularly interassociated hydrocarbon oil and water at a temperature above 500° F., at which the liquid oil is effective to extract a substantial quantity of water, maintaining said complex under a pressure sufficient to cause the constituents to remain in said liquid phase, injecting said complex directly into said producing reservoir and producing oil therefrom.

2. The method as defined in claim 1 wherein said oil is recovered from a producing well located a substantial distance from said injection well.

3. The method according to claim 1 wherein said oil is produced from said formation by terminating said injection step and withdrawing oil from said reservoir via the injection well.

4. The method according to claim 1 wherein said water supplied to the system is a naturally occurring brine and wherein the mineral content of said brine is separated by such extraction.

5. The method according to claim 1 wherein said complex is brought to said high temperature condition by continuously heating the oil stream and by bringing the feed water stream to complexing temperature by direct contact with the hot oil, such that boiler scaling is obviated.

* * * * *